United States Patent Office 3,314,848
Patented Apr. 18, 1967

3,314,848
SEXUAL STERILIZATION OF INSECTS WITH N-SUBSTITUTED UREIDO PHOSPHINE OXIDES
Rudi F. W. Ratz, Hamden, and Miriam J. Gruber, New Haven, Conn., assignors to Olin Mathieson Chemical Corporation, New Haven, Conn., a corporation of Virginia
No Drawing. Original application Mar. 19, 1963, Ser. No. 266,224. Divided and this application June 30, 1964, Ser. No. 387,258
13 Claims. (Cl. 167—13)

This application is a division of copending application Ser. No. 266,224, filed Mar. 19, 1963, now abandoned.

This invention relates to a new class of chemosterilants which are highly effective in combating harmful insects. More particularly it relates to a series of N-substituted ureido phosphine oxides which are characterized by marked biological activity and to a novel process for the preparation of these phosphine oxides.

The primary object of this invention is to prepare a new series of N-substituted ureido phosphine oxides wherein each oxide contains at least two aziridinyl groups connected directly to a phosphorus atom.

Another object of this invention is to provide an efficient process for the preparation of the aforementioned derivatives.

Still another object of this invention is to provide a series of organic phosphorus compounds which possess unusual biological activity especially as chemosterilants.

Another object of this invention is to provide a variety of pest sterilant compositions in which N-substituted ureido bis(1-aziridinyl) phosphine oxides are the principal active ingredients. Other objects will be apparent from the following discussion.

These objects have been accomplished in accordance with this invention. A new series of organic phosphorus compounds has been prepared which can be represented by the general formula:

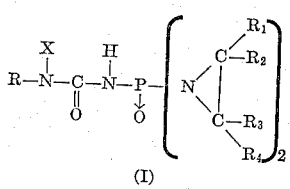

(I)

in which R is selected from the class consisting of an aryl group and a substituted aryl group, and wherein X is selected from the class consisting of hydrogen, a lower alkyl group and a phenyl group, and wherein $R_1$, $R_2$, $R_3$, and $R_4$ are independently selected from the class consisting of a hydrogen atom, an alkyl group, e.g., methyl, ethyl, propyl, and butyl, and an aryl group such as a phenyl group.

An efficient process for the preparation of the compounds having the Formula I is herein provided, and these compounds can be readily prepared and isolated in high purity in accordance with this process.

It has been found that the substituted phosphine oxides having the Formula I possess unusual biological properties. They are extremely effective chemosterilants and can be used in this application even at very low concentrations. A number of pest sterilant compositions can be prepared using compounds of the Formula I as the principal active ingredients.

The compounds having the Formula I are prepared by the reaction of N-substituted ureido phosphoryl dichlo-rides with ethylenimine and its homologs in accordance with the following reaction:

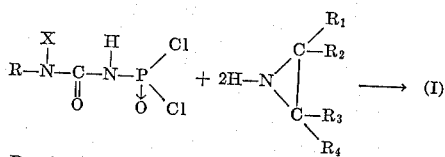

R, X, $R_1$, $R_2$, $R_3$, and $R_4$ in the above equation are as previously defined.

A large number of N-substituted ureido phosphoryl dichlorides can be used in the practice of this invention. In general, compounds having the formula:

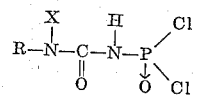

wherein R is selected from the group consisting of aryl radicals and substituted derivatives thereof may be used. Particularly useful are compounds wherein R is selected from the group consisting of phenyl, naphthyl, and anthracyl groups and substituted derivatives thereof. These compounds are prepared by the reaction of isocyanato phosphoryl dichloride and appropriate amines in accordance with the following equation:

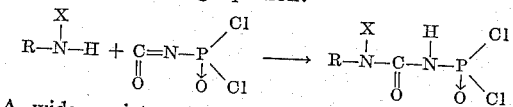

A wide variety of primary and secondary aromatic amines can be reacted with isocyanato phosphoryl dichloride to yield intermediates which can be reacted with ethylenimine and its homologs in accordance with this invention.

Typical of the aromatic amines which can be reacted with isocyanato phosphoryl dichloride to give compounds useful in the practice of this invention are the following haloanilines: o-fluoroaniline, m-fluoroaniline, p-fluoroaniline, o-chloroaniline, m-chloroaniline, p-chloroaniline, o-bromoaniline, m-bromoaniline, p-bromoaniline, o-iodoaniline, m-iodoaniline, p-iodoaniline, 2,3-dichloroaniline, 2,3-dibromoaniline, 2,4-difluoroaniline, 2,4-dichloroaniline, 2,4-dibromoaniline, 2,5-difluoroaniline, 2,5-dichloroaniline, 2,5-dibromoaniline, 2,6-dichloroaniline, 2,6-dibromoaniline, 3,4-dichloroaniline, 3,4-dibromoaniline, 3,5-dichloroaniline, 3,5-dibromoaniline, 2,3,4-trichloroaniline, 2,3,4-tribromoaniline, 2,3,5-trichloroaniline, 2,3,5-tribromoaniline, 2,3,5-triiodoaniline, 2,3,6-trichloroaniline, 2,3,6-triiodoaniline, 2,4,5-trichloroaniline, 2,4,5-tribromoaniline, 2,4,5-triiodoaniline, 2,4,6-trichloroaniline, 2,4,6-tribromoaniline, 2,4,6-triiodoaniline, 3,4,5-trichloroaniline, 3,4,5-tribromoaniline, 3,4,5-triiodoaniline, 2,3,4,5-tetrachloroaniline, 2,3,4,5-tetrabromoaniline, 2,3,4,6-tetrachloroaniline, 2,3,4,6-tetrabromoaniline, 2,3,4,6-tetraiodoaniline 2,3,5,6-tetrachloroaniline, 2,3,5,6-tetrabromoaniline, 2,3,4,5,6-pentachloroaniline, and 2,3,4,5,6-pentabromoaniline.

Furthermore other haloanilines can be reacted with isocyanato phosphoryl dichloride to yield N-substituted ureido phosphoryl dichlorides which upon reaction with ethylenimine and its homologs give compounds having the Formula I wherein X is a lower alkyl group or phenyl. Some of these haloanilines include: 2-chloro-N-methylaniline, 3-chloro-N-methylaniline, 4-chloro-N-methylaniline, 2,4 - dichloro - N - methylaniline, 2,4,6-trichloro-N-methylaniline, 2 - bromo - N-methylaniline, 4-bromo-N- methylaniline, 2,4-dibromo-N-methylaniline, and 2,4,6-tribromo-N-methylaniline. Similarly, the same N-ethyl or N-phenyl derivatives may be used, e.g. 2-chloro-N-ethylaniline, 3-chloro-N-phenylaniline, and 4-bromo-N-ethylaniline.

Likewise compounds of the Formula I wherein R is a nitrated phenyl group can be prepared by the use of intermediates made by the reaction of isocyanato phosphoryl dichloride with various nitrated anilines. Some of these nitrated anilines includes: 2,4-dinitroaniline, 2,4-dinitromethylaniline, 2,4-dinitrodiphenylamine, 2,4,2',4'-tetranitrodiphenylamine, 2,5-dinitroaniline, 2,6-dinitroaniline, 3,5-dinitroaniline, 2,4,6-trinitroaniline, 2,4,6-trinitromethylaniline, 2,4,6-trinitrodipheynlamine, 2,4,6,2',4',6'-hexanitrodiphenylamine, 2,3,4,6-tetranitroaniline, pentanitroaniline, 3-nitro-2-aminotoluene, 5-nitro-2-aminotoluene, 4-nitro-2-aminotoluene, 2-nitro-4-aminotoluene, 6-nitro-3-aminotoluene, 3 - nitro - 4 - aminotoluene, 2,6-dinitro-4-aminotoluene, 4,6 - dinitro - 2 - aminotoluene, 5-nitro-4-amino - o - xylene, 3 - nitro-4-amino-o-xylene, 6-nitro-4-amino - m - xylene, 5-nitro-4-amino-m-xylene, 4-nitro-2-amino-m-xylene, 5-nitro-2-amino-p-xylene, p-nitrosoaniline, and p-nitrosomethylaniline.

Various amines containing a naphthyl group and substituted naphthyl groups may also be reacted with isocyanato phosphoryl dichloride to provide intermediates which may be used in this invention. Typical of such amines are: 1-naphthylamine, 2-naphthylamine, 1-methylaminonaphthalene, N-phenyl-α-naphthylamine, N-o-tolyl-α-naphthylamine, N-p-tolyl-α-naphthylamine, 2-phenylaminonaphthalene, 4-chloro-1-naphthylamine, 2,4-dichloro-1-naphthylamine, 2-chloro-1-naphthylamine, 1,4-dichloro-2-naphthylamine, 1,6-dibromo-2-naphthylamine, 3-bromo-1-chloro-2-naphthylamine, 6-chloro-2-naphthylamine, 6-iodo-2-naphthylamine, 7-chloro-2-naphthylamine, 7-bromo-2-naphthylamine, 7-iodo-2-naphthylamine, 5-nitro-1-naphthylamine, 8-nitro-1-naphthylamine, 2-nitro-1-naphthylamine, 4-nitro-1-naphthylamine, 2,4-dinitro-1-naphthylamine, 3-nitro-1-naphthylamine, 6-nitro-1-naphthylamine, 7-nitro-1-naphthylamine, 5-nitro-2-naphthylamine, 8-nitro-2-naphthylamine, 1-nitro-2-naphthylamine, 1,8-dinitro-2-naphthylamine, 3-nitro-2-naphthylamine, 4-nitro-2-naphthylamine, 1,6-dinitro-2-naphthylamine, and 1,6,8-trinitro-2-naphthylamine.

N-substituted ureido phosphoryl dichlorides useful in the practice of this invention can also be prepared by the reaction of isocyanato phosphoryl dichloride with aromatic amines of the following nature: 1-amino-anthracene, 2-amino-anthracene, 9-amino-anthracene, p-aminobenzenesulfonamide, and p-aminobenzenesulfanilide.

The preferred ethylenimines which are suitable for use in this invention are ethylenimine and 2-methyl-ethylenimine. However, 2,2-dimethyl-ethylenimine, 2-phenylethylenimine, 2,3-dimethylethylenimine, 2,3-diphenyl-ethylenimine, 2,2,3-triethyl-ethylenimine, and 2,2-diethyl-3-n-propyl-ethylenimine can also be used in the preparation of the compounds included in the general Formula I.

The reaction of N-substituted ureido phosphoryl dichlorides with the aforementioned ethylenimines is performed in the presence of an inert solvent or diluent. It has been found that many of the preparations proceed very readily in an organic solvent, and many of the desired aziridinyl derivatives can be thus prepared and isolated in good purity. For instance, bis(1-aziridinyl)-2-nitrophenylureido phosphine oxide and bis(1-aziridinyl)-3,4-dichlorophenylureido have been prepared in excellent yield in the presence of an organic solvent (i.e., Example 9 herein). Example 13 is also illustrative of this procedure. However, the use of anhydrous organic solvents or diluents does not appear to be entirely satisfactory in the preparation of several of the aziridinyl derivatives. Example 14 of this specification illustrates that bis(1-aziridinyl)-4-cyanophenylureido phosphine oxide could only be obtained in crude form when a chloroform diluent was utilized in the reaction procedure. Similarly, attempts to prepare bis-(1-aziridinyl)-4-nitrophenylureido phosphine oxide in an anhydrous medium were accompanied by numerous process difficulties. It was impossible to obtain even a reasonably pure compound, and it could only be obtained as a smeary residue. Therefore, although many of the novel aziridinyl derivatives of this invention can be prepared while using organic solvents or diluents in the process, there are occasions where the use of these solvents presents difficulties with respect to purity of the desired product.

However, it has been found that the N-substituted ureido phosphoryl chlorides can be readily reacted with the ethylenimines in aqueous media, and the use of this procedure is the preferred process embodiment of this invention. This was somewhat unexpected since it had been assumed that the starting dichlorides would be hydrolyzed as a result of this procedure. However, the aziridinyl derivatives can be obtained in high yield and excellent purity with a minimum of process difficulties by utilizing an aqueous media in the reaction process. In general, the resulting aziridinyl derivatives are sparingly soluble in water and can be easily filtered from the reaction mixture at the conclusion of the reaction. This occurred despite the fact that the nature of the aziridinyl derivatives is weakly acidic, and it could be assumed that they would be fairly soluble in the alkaline reaction medium. However, this does not occur, and the aziridinyl derivatives invariably separated from the aqueous reaction medium in the form of finely dispersed particles which may be easily separated and purified.

The preparation of the compounds of this invention, whether performed in non-aqueous media or in aqueous media, should be performed at reaction temperatures of below about 30° C. The reactions can be carried out in aqueous media at temperatures of from about −10° C. to about 30° C., but the preferred temperature range at which the compounds can be prepared in aqueous media is from about −5° C. to about 15° C.

An acid acceptor should be used in the process of this invention. If desired, a molar excess of the ethylenimine involved may be used during the reaction, in which event the excess will serve as an acid acceptor and take up the by-product, hydrochloric acid. However, the preferred method is to eliminate the use of costly excess ethylenimine by the use of another acid acceptor. In this manner only the theoretical amount of the ethylenimine need be employed in the process. When the preparation involves the use of an organic solvent or diluent, suitable acid acceptors which may be utilized are ammonia, tertiary amines such triethylamine, and other compounds including pyridine, N-ethyl morpholine and dimethylacetamide, etc. When the preparations are performed in aqueous media, alkali metal or alkaline earth hydroxides can be used as acid acceptors.

The following examples describe the preparation of several of the N-substituted ureido bis(1-aziridinyl) phosphine oxides of this invention. These examples are illustrative only, and they are not to be construed as limiting the scope of this invention since many variations are possible.

Example 1

Isocyanato phosphoryl dichloride was prepared in accordance with the procedure of Kirsanov et al. (J. Gen. Chem. U.S.S.R., 31, 1496 (1961), English trans.).

A two liter round bottom flask was equipped with a mechanical stirrer, dropping funnel, thermometer and a condenser connected from the top to a trap containing dichloroethane. Into the flask was placed 832.0 g. (4.0 mole) of phosphorus pentachloride and 240 ml. of dichloroethane. The reaction mixture was warmed by immersion of the flask in a mineral oil bath heated to 105° C. In the dropping funnel was placed 356.0 g. (4.0 mole) of ethyl carbamate which was melted and kept in a molten state by means of a stream of hot air. The ethyl carbamate was added dropwise to the reaction flask at such a rate that the reaction temperature was maintained between 75° to 78° C. The mineral oil bath was held between 95°–109° C. during the addition period. When the addition of the carbamate was completed, a clear yellow solution had been obtained and gas evolution had slowed considerably. The dichloroethane from the trap was then added to the reaction mixture. The solvent was removed by distillation at reduced pressure, and then 424.2 g. of a colorless liquid was obtained, B.P. 50°–51° C./22 mm., $n_D^{6.5}$ 1.4757. This material is isocyanato phosphoryl dichloride. Yield: 66.3%. $n_D^{15}$ 1.470 had been reported previously in (Kirsanov et al., ibid., 24, 1031 (1954), English trans.).

*Example 2*

A solution of 16.0 g. (0.10 mole) of isocyanato phosphoryl dichloride in 100 ml. of anhydrous ethyl ether was placed in a 500 ml. round bottom three-necked reaction flask equipped with a mechanical stirrer, dropping funnel and a reflux condenser, the latter connected with a calcium chloride filled drying tube. The solution was cooled with an ice bath to about 0° to 15° C., and a solution of 12.0 g. (0.102 mole) of p-aminobenzonitrile in 140 ml. of ethyl ether was added dropwise with stirring over a one hour period. A fine white solid separated immediately from the reaction mixture. Stirring was continued at 0° to 15° C. for 15 minutes and finally for 30 minutes at room temperature. The mixture was then allowed to stand for 30 minutes before it was filtered. The filtered product was dried and there was obtained 26.8 g. of a pale lavender powder which melted with decomposition at 163° C. The following analytical data revealed that N-4-cyanophenylureido phosphoryl dichloride had been obtained. Yield: 96.4%.

*Analysis.*—Calcd. for $C_8H_6Cl_2N_3O_2P$: N, 15.11; P, 11.14. Found: N, 14.84; P, 11.25.

A solution of 0.143 (0.0036 mole) of sodium hydroxide and 0.1517 g. (0.0036 mole) of ethylenimine in 2 ml. of distilled water was placed in a 50 ml. bottle with a screw cap closure. The solution was cooled to −10° C., and 0.4980 g. (0.0018 mole) of N-4-cyanophenylureido phosphoryl dichloride was added in three portions. After standing for 1½ hours the reaction mixture which was then a slightly tan paste was filtered using a Büchner funnel. After drying, there was obtained 0.30 g. of a powdery material having a melting point of 197° to 198° C. The melting point determination was carried out on the preheated plate of a Fisher-Johns apparatus. The lowest temperature at which clear melting occurred upon slight pressure was recorded as the melting point. This procedure was also applied in all other examples of this invention. Melting was followed by polymerization. The following analytical data revealed that bis(1-aziridinyl)-4-cyanophenylureido phosphine oxide had been obtained. Yield: 57.9%.

*Analysis.*—Calcd. for $C_{12}H_{14}N_5O_2P$: C, 49.49; H, 4.85; N, 24.05; P, 10.63. Found: C, 48.23; H, 5.28; N, 23.61; P, 10.59.

*Example 3*

Isocyanato phosphoryl dichloride was reacted with p-chloroaniline in the same manner as shown in Example 2, and N-4-chlorophenylureido phosphoryl dichloride was obtained in 65.5% yield. It is a white solid which melts at 159°–161° C. on a preheated melting point block.

A solution of 1.60 g. (0.04 mole) of sodium hydroxide and 1.72 g. (0.04 mole) of ethylenimine in 20 ml. of distilled water was placed in a 50 ml. bottle with a screw cap closure. The solution was cooled to −8° C. by means of a Dry Ice-acetone bath, and 5.750 g. (0.02 mole) of N-4-chlorophenylureido phosphoryl dichloride was added in five equal portions with stirring and maintaining the external cooling. The temperature of the reaction mixture rose to a maximum of +2° C. during the reaction period. The mixture was allowed to stand for one hour, and at this point a fine, crystalline powder had separated. The product was filtered and washed with two 10 ml. portions of water. Tests for ionic chlorine were negative. The material was recrystallized from dimethylformamide to give small, colorless needles having a melting point of 211° C. on a preheated plate. Melting was followed by polymerization. The following analytical data revealed that bis(1-aziridinyl) - 4 - chlorophenylureido phosphine oxide had been obtained. Yield: 45.0%.

*Analysis.*—Calcd. for $C_{11}H_{14}N_4O_2PCl$: C, 43.94; H, 4.69; N, 18.63; P, 10.30; Cl, 11.79. Found: C, 43.90; H, 4.88; N, 18.75; P, 10.68; Cl, 11.80.

*Example 4*

Isocyanato phosphoryl dichloride was reacted with 3,4-dichloroaniline in the same manner as shown in Example 2, and N-3,4-dichlorophenylureido phosphoryl dichloride was obtained in 97.2% yield. It is a white solid having a melting point of 161°–168° C. accompanied by decomposition.

A solution of 1.52 g. (0.038 mole) of sodium hydroxide and 1.63 g. (0.038 mole) of ethylenimine in 20 ml. of water was placed in a 50 ml. bottle with a screw cap closure. The solution was cooled to −7° C. by means of an ice-salt mixture, and 6.1 g. (0.0189 mole) of N-3,4-dichlorophenylureido phosphoryl dichloride was added in six equal portions with stirring at such a rate that the temperature of the reaction mixture was kept between −5° C. and 0° C. After addition was completed, the reaction mixture was allowed to stand at room temperature for one hour. At this point a colorless crystalline product had separated from solution, and this material was collected by suction filtration. There was obtained 2.7 g. of a colorless, free-flowing crystalline powder having a melting point of 190°–192° C. accompanied by polymerization. The following analytical data revealed that bis(1-aziridinyl)3,4-dichlorophenylureido phosphine oxide had been obtained. Yield: 42.5%.

*Analysis.*—Calcd. for $C_{11}H_{13}Cl_2N_4O_2P$: C, 39.40; H, 3.88; N, 16.72; P, 9.25. Found: C, 38.56; H, 4.74; N, 16.19; P, 8.83.

*Example 5*

Isocyanato phosphoryl dichloride was reacted with o-chloroaniline in the same manner as shown in Example 2, and N-2-chlorophenylureido phosphoryl dichloride was obtained in 60% yield. It is a white solid which melts at 118°–120° C. on a preheated melting point block.

A solution of 1.60 g. (0.04 mole) of sodium hydroxide and 1.75 g. (0.0407 mole) of ethyleneimine in 20 ml. of distilled water was placed in a 50 ml. bottle with a screw cap closure. The solution was cooled to −10° C. by means of a Dry Ice-acetone bath, and 5.75 g. (0.02 mole) of N-2-chlorophenylureido phosphoryl dichloride was added in three portions while the reaction temperature was maintained below 0° C. After standing one hour a colorless crystalline powder had separated, and the product was collected on a Büchner funnel. This material was washed with two 10 ml. portions of water, and at this point tests for ionic chlorine were negative. Recrystallization from dimethylformamide gave shining crystals having a melting point of 177° C. on a preheated plate. Melting was followed by polymerization. The following analytical data revealed that bis(1-aziridinyl)-2-chlorophenylureido phosphine oxide had been obtained. Yield: 41.6%.

*Analysis.*—Calcd. for $C_{11}H_{14}ClN_4O_2P$: C, 43.94; H, 4.69; N, 18.63; P, 10.30; Cl, 11.79. Found: C, 43.82; H, 5.10; N, 18.92; P, 10.66; Cl, 11.80.

*Example 6*

Isocyanato phosphoryl dichloride was reacted with 2,5-dichloroaniline in the same manner as shown in Example 2, and N-2,5-dichlorophenylureido phosphoryl dichloride was obtained in 64.9% yield. It is a white solid having a melting point of 157° to 158° C.

A solution of 2.4 g. (0.06 mole) of sodium hydroxide and 2.58 g. (0.06 mole) of ethylenimine in 20 ml. of distilled water was placed in a 50 ml. bottle with a screw cap closure. The solution was cooled to −10° C., and 9.66 g. (0.03 mole) of N-2,5-dichlorophenylureido phosphoryl dichloride was added in five equal portions with shaking. The reaction mixture was maintained below −7° C. during this period. After addition was completed, the reaction mixture was allowed to come to room temperature with frequent shaking, and was then recooled to −10° C. and filtered through a Büchner funnel. The solid material was washed with a 10 ml. portion of water, and 6.7 g. of a white solid was thus obtained. This material was recrystallized from dimethylformamide to give a crystalline material having a melting point of 171°–172° C. Melting was followed by polymerization. The following analytical data revealed that bis(1-aziridinyl)-2,5-dichlorophenylureido phosphine oxide had been obtained. Yield: 66.7%.

Analysis.—Calcd. for $C_{11}H_{13}Cl_2N_4O_2P$: C, 39.40; H, 3.88; N, 16.72; P, 9.25. Found: C, 39.23; H, 3.89; N, 16.77; P, 8.90.

Example 7

Isocyanato phosphoryl dichloride was reacted with 2,4,6-trichloroaniline in the same manner as shown in Example 2, and N-2,4,6-trichlorophenylureido phosphoryl dichloride was obtained in 84.4% yield. It is a white solid having a melting point of 157°–160° C.

A solution of 0.8 g. (0.02 mole) of sodium hydroxide and 0.903 g. (0.021 mole) of ethylenimine in 10 ml. of water was placed in a 50 ml. bottle with a screw cap closure. The solution was cooled to −10° C., and 3.565 g. (0.01 mole) of N-2,4,6-trichlorophenylureido phosphoryl dichloride was added to the bottle in several small portions with stirring and shaking. During the addition period, the temperature was maintained below −4° C. After addition was complete, the mixture was kept below −4° C. for an additional 45 minutes and finally was kept at room temperature for 1½ hours longer. The mixture was then filtered through a Büchner funnel and 1.0 g. of a white solid material was obtained which was washed once with a small portion of water. It was again filtered and dried to give 0.5 g. which melted at 202° C. on a preheated plate followed by immediate polymerization. The following analytical data revealed that the desired bis(1-aziridinyl)-2,4,6-trichlorophenylureido phosphine oxide had been obtained. Yield: 13.5%.

Analysis.—Calcd. for $C_{11}H_{12}Cl_3N_4O_2P$: N, 15.17; P, 8.39. Found: N, 14.43; P, 7.77.

Example 8

Isocyanato phosphoryl dichloride was reacted with 4-chloro-2-nitroaniline in the same manner as shown in Example 2, and N-4-chloro-2-nitrophenylureido phosphoryl dichloride was obtained in 63% yield. It is a pale yellow solid having a melting point of 152° to 156° C.

A solution of 1.26 g. (0.0315 mole) of sodium hydroxide and 1.3524 g. (0.0315 mole) of ethylenimine in 20 ml. of water was placed in a 50 ml. bottle with a screw cap closure and cooled to about −5° C. by means of an ice-salt mixture. Then 4.98 g. (0.0157 mole) of N-4-chloro-2-nitrophenylureido phosphoryl dichloride was added to the bottle in small portions with frequent shaking. A thick yellow paste resulted which was well shaken and allowed to stand at about −5° C. for 15 minutes. The mixture was filtered through a Büchner funnel. The filtered solid was washed with two 50 ml. portions of water, rinsed with acetone and dried. This solid was recrystallized from dimethylformamide to give a yellow crystalline powder having a melting point of 187° to 188° C. The following analytical data revealed that bis(1-aziridinyl)-4-chloro-2-nitrophenylureido phosphine oxide had been obtained. Yield: 83.3%.

Analysis.—Calcd. for $C_{11}H_{13}ClN_5O_4P$: C, 38.22; H, 3.79; P, 8.96. Found: C, 38.35; H, 4.72; P, 8.49.

Example 9

Isocyanato phosphoryl dichloride was reacted with o-nitroaniline in the same manner as shown in Example 2, and N-2-nitrophenylureido phosphoryl dichloride was obtained in 78.2% yield. It is a pale yellow solid having a melting point of 143°–145° C.

A 500 ml. round bottom three-necked reaction flask was equipped with a mechanical stirrer, dropping funnel, and a reflux condenser connected with a calcium chloride filled drying tube. Into the flask was placed 6.0 g. (0.020 mole) of N-2-nitrophenylureido phosphoryl dichloride and 100 ml. of anhydrous ethyl ether. Between 0° and 10° C. a solution of 2.0 g. (0.0465 mole) of ethylenimine and 4.20 g. (0.0416 mole) of triethylamine in 53 ml. of ethyl ether was added dropwise with stirring over a period of 45 minutes. The reaction mixture was then allowed to stand overnight. The mixture was filtered, and the yellow solid on the filter plate was rinsed with ether, washed with 50 ml. of distilled water, and finally again with ether. After drying over phosphorus pentoxide, there was obtained a yellow crystalline solid which melted at 156.5° C. on a preheated block. The following analytical data revealed that bis(1-aziridinyl)-2-nitrophenylureido phosphine oxide had been obtained. Yield: 82.3%.

Analysis.—Calcd. for $C_{11}H_{14}N_5O_4P$: C, 42.44; H, 4.50; N, 22.51. Found: C, 42.44; H, 5.18; N, 22.22.

Example 10

Isocyanato phosphoryl dichloride was reacted with p-nitroaniline in the same manner as shown in Example 2, and N-4-nitrophenylureido phosphoryl dichloride was obtained in 80.5% yield. It is a pale yellow solid which melts at 161° C. on a preheated plate accompanied by decomposition.

A solution of 1.6044 g. (0.0401 mole) of sodium hydroxide and 1.8165 g. (0.0422 mole) of ethylenimine in 15 ml. of distilled water was placed in a 50 ml. bottle with a screw cap closure and cooled to −11° C. Then 5.9614 g. (0.020 mole) of N-4-nitrophenylureido phosphoryl dichloride was added in small portions with stirring while the reaction temperature was maintained below −5° C. The mixture was shaken thoroughly and kept at approximately −5° C. for an additional 30 minutes and finally was kept at room temperature for 45 minutes. After filtration, a fine yellow powder was obtained which was washed once with water. Tests for ionic chlorine at this point were negative. After drying, a fine yellow crystalline material was obtained which melted at 199°–201° C., followed by polymerization. The following analytical data revealed that bis(1-aziridinyl)-4-nitrophenylureido phosphine oxide had been obtained. Yield: 69.4%.

Analysis.—Calcd. for $C_{11}H_{14}N_5O_4P$: C, 42.45; H, 4.53; N, 22.50; P, 9.95. Found: C, 41.08; H, 4.67; N, 20.96; P, 9.95.

Example 11

Isocyanato phosphoryl dichloride was reacted with aniline in the same manner as shown in Example 2, and N-phenylureido phosphoryl dichloride was obtained in 96.4% yield. It is a white finely-divided crystalline material having a melting point of 122°–123° C.

A solution of 0.68 g. (0.017 mole) of sodium hydroxide and 0.73 g. (0.017 mole) of ethylenimine in 10 ml. of distilled water was placed in a 50 ml. bottle with a screw cap closure and cooled to −5° C. by means of an ice-salt mixture. Then 2.1 g. (0.0083 mole) of N-phenylureido phosphoryl dichloride was added in small portions to the solution. The mixture was well shaken and maintained at −5° C., and a white product quickly precipitated. This solid material was filtered and dried. On a preheated block a melting point of 184° C. was determined. Melting was accompanied with polymerization. The following analytical data revealed that bis(1-aziridinyl)phenylureido phosphine oxide had been obtained. Yield: 45.5%.

*Analysis.*—Calcd. for $C_{11}H_{15}N_4O_2P$: C, 49.62; H, 5.68; N, 21.05; P, 11.63. Found: C, 49.28; H, 6.76; N, 20.1; P, 11.46.

*Example 12*

Isocyanato phosphoryl dichloride was reacted with 1-napthylamine in the same manner as shown in Example 2, and N-1-napthylureido phosphoryl dichloride was obtained in 88.5% yield. It is a white powder which melts at 122.5°–125° C.

A solution of 1.6014 g. (0.04 mole) of sodium hydroxide and 1.7913 g (0.0417 mole) of ethylenimine in 10 ml. of distilled water was placed in 50 ml. bottle with a screw cap closure and cooled to −4° C. by a Dry-Ice-acetone mixture. Then 6.061 g. (0.02 mole) of N-1-naphtylureido phosphoryl dichloride was added to the bottle in small portions with stirring while the reaction temperature was maintained below 5° C. When addition was completed, a solid product had formed which was allowed to stand for a short period before it was broken into smaller particles by grinding. This material was filtered, washed with 10 ml. of cold water and dried. The following analytical data obtained on the crude product revealed that the desired bis(1-aziridinyl)-1-napthylureido phosphine oxide had been obtained.

*Analysis.*—Calcd. for $C_{15}H_{17}N_4O_2P$: N, 17.71; P, 9.79. Found: N, 16.67; P, 9.48.

*Example 13*

A 500 ml. round bottom three-necked reaction flask was equipped with a mechanical stirrer, dropping funnel and a reflux condenser connected with a calcium chloride filled drying table. Into the flast was placed 4.3 g. (0.014 mole) of N-2-nitrophenylureido phosphoryl dichloride and 80 ml. of anhydrous ethyl ether. Between 0° and 10° C., a solution of 2.0 g. (0.035 mole) of propylenimine and 3.0 g (0.030 mole) of triethylamine in 50 ml. of ethyl ether was added dropwise with stirring over a period of 40 minutes. Stirring was continued for 20 minutes longer, and the mixture was then allowed to stand overnight. The mixture was filtered, and a yellow solid was obtained which was washed twice with distilled water and twice with small portions of anhydrous ethyl ether. The solid was filtered and dried in vacuum over phosphorous pentoxide. A yellow crystalline solid was obtained which melted at 138°–140° C. The following analytical data revealed that bis[1-(2-methylaziridinyl)]-2-nitrophenylureido phosphine oxide had been obtained. Yield: 86.3%.

*Analysis.*—Calcd. for $C_{13}H_{18}N_5O_4P$: C, 46.02; H, 5.35. Found: C, 45.7; H, 5.7.

*Example 14*

A 500 ml. round bottom three-necked reaction flask was equipped with a Allin condenser bearing a calcium chloride filled drying tube, a mechanical stirrer, and a dropping funnel. Into the reaction flask was placed a slurry of 10.2 g. (0.04 mole) of N-4-cyanophenylureido phosphoryl dichloride in 140 ml. of chloroform. Into the dropping funnel was placed a solution of 3.4 g. (0.08 mole) of ethylenimine and 8.1 g. (0.08 mole) of triethylamine in 90 ml. of chloroform. The reaction flask was cooled by immersion in an ice water bath to about 2° C., and the solution in the dropping funnel was added to the reaction flask with stirring over a one hour period. During this period vapors gathered in the reaction flask and the color of the reaction mixture changed from a pale lavender to a light orange color. Stirring was continued for an addition ½ hour and then the reaction mixture was allowed to stand for two hours. The solvent was evaporated in vacuum, and the residual material was washed with distilled water in order to remove triethylamine hydrochloride. A white semi-solid material remained which was triturated with diethyl ether to remove a sticky contaminant. After drying, a while solid was obtained which melted at 79°–81° C. with decomposition followed by polymerization. The following analytical data revealed that crude bis(1-aziridinyl)-4-cyanophenylureido phosphine oxide had been obtained.

*Analysis.*—Calcd. for $C_{12}H_{14}N_5O_2P$: C, 49.49; H, 4.85; N, 24.05; P, 10.63. Found: C, 49.49; H, 6.12; N, 17.92; P, 8.48.

As mentioned in the preceding discussion, it has been found that the organic phosphorus compounds having the general Formula I are characterized by a high degree of biological activity, and they are particularly effective as chemosterilants in the controlling of harmful insects. Although the compounds of this invention can be used alone as chemosterilants, it is more practical to utilize them in a dispersed form admixed with a major amount of suitable carrier or extending agent. A variety of pest sterilant compositions can be prepared containing these compounds as the principal active ingredient.

The term "dispersed" as used herein is used in a broad sense. When it is said that the phosphine oxides having the Formula I are dispersed, it means that the particles may be molecular in size and held in true solution in a suitable solvent. It means further that the particle may be colloidal in size and dispersed through a liquid phase in the form of suspension or emulsions or in the form of particles held in suspension by wetting agents. The compounds may also be dispersed and admixed in solid carriers so as to form powders, dusts or granular preparations.

The term "extending agent" as used in this specification and claims includes any and all of those carriers or diluents in which the compounds of this invention are dispersed. For example, it includes the solvents of a true solution, the liquid phase of suspensions and emulsions and the solid carriers of a powder or dust.

The phosphine oxides of the general Formula I may be combined with a large number of diluents to give sterilant formulations which can be applied to harmful insects either topically or in the form of food.

For example, the phosphine oxides of this invention can be formulated with various carriers to form "baits" which when fed to harmful insects prove to be excellent pest sterilant compositions. The following procedure will serve to illustrate how the compounds of this invention can be formulated into baits suitable for sterilizing insects.

A solution of 0.5 g. of bis(1-aziridinyl)-3,4-dichlorophenyl ureido phosphine oxide in 50 ml. of chloroform was prepared. This solution was blended with 100 g. of granulated sucrose, and after a thorough mixing of the solution with the sucrose, the solvent was evaporated. The residual solid material was ground in a mortar. This bait was fed to twenty-four hour old houseflies for a period of five days. On the succeeding two days, eggs were collected from a prepared oviposition site and incubated for 24 hours at 75° F. These eggs were then inspected under a binocular microscope for "hatching." All "unhatched" eggs are considered non-viable or sterile, and the data were recorded as percent sterile eggs. Under the conditions of this procedure 99% of the eggs were non-viable. It has been found that a good sterilant should cause about 85% sterility at 0.5% concentration, and this value is generally exceeded by compounds of this invention. In fact, it is an important feature of this invention that the chemosterilants described herein possess a high degree of effectiveness when used with carriers and diluents at concentrations of 0.01% by weight and even lower.

The following tabulated information illustrates the effectiveness of several other phosphine oxides of this invention when they were tested as sterilants in a similar manner.

| Chemical Name | Percent Active Ingredient in Bait | Percent Non-viable Eggs |
|---|---|---|
| Bis(1-aziridinyl)-3,4-dichlorophenyl-ureido phosphine oxide | 0.025 | 99 |
|  | 0.5 | 98 |
| Bis(1-aziridinyl)-2-nitrophenylureido phosphine oxide | 0.025 | 97 |
| Bis[1(2-methylaziridinyl)]-2-nitrophenylureido phosphine oxide | 0.5 | 99 |
| Bis(1-aziridinyl)-N-phenylureido phosphine oxide | 0.1 | 98 |
| Bis(1-aziridinyl)-N-(4-chlorophenyl) ureido phosphine oxide | 0.1 | 99 |
| Bis(1-aziridinyl)-N-(2-chlorophenyl) ureido phosphine oxide | 0.1 | 98 |
| Bis(1-aziridinyl)-N-(2,5-dichlorophenyl) ureido phosphine oxide | 0.1 | 77 |

A number of other carriers may be employed as extending agents in baits in addition to the sugar carriers described above. Examples of other carriers include corn grits, limestone, pumice, corn cob grits of varying particle sizes, walnut shell aggregate, a mixture of powdered eggshells, powdered milk-sucrose, talc, Pyrax granules, concrete sand, etc. When the carrier is not sugar, it is advantageous to add about 5 to 50% by weight of sugar to the carrier as a lure.

The compounds of the Formula I can also be admixed with a major amount of various solid extending agents to provide pest sterilant formulations which can be applied as powders or dusts. Dry extenders suitable for such use include kaolin, calcium carbonate, talc, Barden's clay, Attapulgus clay and others. These pest sterilant compositions may be utilized in the dry form or, if so desired, a wetting agent may be used to prepare wettable powders.

The chemosterilants of this invention may also be used to combat harmful insects in the form of emulsions. These emulsions can be prepared by dissolving the active ingredient in a solvent which is not miscible with water, and adding water to the solution in the presence of an emulsifying agent. Emulsion formulations of this nature can be readily sprayed in desired locations.

The chemosterilants described herein can also be dispersed in an inert carrier such as water to provide useful suspension formulations. Usually a surface active agent can be advantageously used in these formulations, but this is not a necessity. For example, bis(1-aziridinyl)-3,4-dichlorophenyl ureido phosphine oxide was ball milled with water to provide a very fine colloidal suspension containing 0.5% by weight of active ingredient. Thirty ml. of this suspension was sprayed on houseflies in a small cage. The flies were left in this cage for one hour before they were transferred to a larger cage and fed milk. Subsequently, eggs were collected from a prepared oviposition site and incubated for 24 hours at 75° F. These eggs were inspected under a microscope for hatching, and 99% of the eggs were found to be non-viable.

Of course, the N-substituted ureido bis(1-aziridinyl) phosphine oxides can also be dissolved in various solvents useful in the spraying of harmful insects. Suitable solvents include: acetone, chlorinated hydrocarbons such as chloroform, etc., dimethylacetamide, dimethylformamide and others.

The chemosterilants described here may be used in the control of a wide variety of harmful insects including houseflies, latrine flies, the screw worm fly, the stable fly, vinegar fly, the Mediterranean fruit fly, the Mexican fruit fly, the Oriental fruit fly, the bool weevil, eye gnats, and others. They may also be used in sterilizing compositions applicable in the control of the malarial mosquito.

What is claimed is:

1. A method for the sterilization of insects which comprises contacting said insects with an amount sufficient to exert a sterilizing action of a compound having the formula

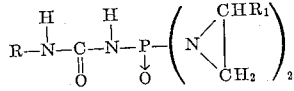

where R is selected from the class consisting of phenyl, naphthyl, halogenated phenyl, nitrated phenyl, and cyanophenyl; and $R_1$ is hydrogen or methyl.

2. The method of claim 1 wherein $R_1$ is methyl.
3. The method of claim 2 wherein R is nitrated phenyl.
4. The method of claim 3 in which the compound is bis[1(2-methylaziridinyl)]-N-2-nitrophenylureido phosphine oxide.
5. A method for the sterilization of insects which comprises contacting said insects with an amount sufficient to exert a sterilizing action of a compound having the formula

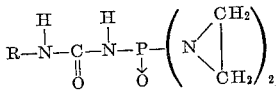

where R is selected from the class consisting of phenyl, naphthyl, halogenated phenyl, nitrated phenyl, and cyanophenyl.

6. The method of calim 5 in which the compound is bis(1-aziridinyl)-N-phenylureido phosphine oxide.
7. The method of claim 5 wherein R is nitrated phenyl.
8. The method of claim 7 in which the compound is bis(1-aziridinyl)-N-2-nitrophenylureido phosphine oxide.
9. The method of claim 5 wherein R is halogenated phenyl.
10. The method of claim 9 in which the compound is bis(1-aziridinyl)-N-3,4-dichlorophenylureido phosphine oxide.
11. The method of claim 9 in which the compound is bis(1-aziridinyl)-N-(4-chlorophenyl) ureido phosphine oxide.
12. The method of claim 9 in which the compound is bis(1-aziridinyl)-N-(2-chlorophenyl) ureido phosphine oxide.
13. The method of claim 9 in which the compound is bis(1-aziridinyl)-N-(2,5-dichlorophenyl) ureido phosphine oxide.

References Cited by the Examiner

UNITED STATES PATENTS 3,201,313   8/1965   Bardos et al. _____ 167—78

FOREIGN PATENTS 610,695   5/1962   Belgium.

OTHER REFERENCES

Barkovec: Science, vol. 137, pages 1034 to 1036, Sept. 28, 1962.

La Brecque et al.: Journal of Economic Entomology, vol. 55, No. 4, pages 449–451, August 1962.

LEWIS GOTTS, *Primary Examiner.*

RICHARD L. HUFF, *Assistant Examiner.*